United States Patent
Zhao

(10) Patent No.: US 12,538,268 B2
(45) Date of Patent: Jan. 27, 2026

(54) METHOD AND APPARATUS FOR USER EQUIPMENT SIDELINK COMMUNICATION, USER EQUIPMENT AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 475 days.

(21) Appl. No.: 18/012,817

(22) PCT Filed: Jun. 24, 2020

(86) PCT No.: PCT/CN2020/098226
§ 371 (c)(1),
(2) Date: Dec. 23, 2022

(87) PCT Pub. No.: WO2021/258364
PCT Pub. Date: Dec. 30, 2021

(65) Prior Publication Data
US 2023/0254817 A1    Aug. 10, 2023

(51) Int. Cl.
*H04W 72/02* (2009.01)
*H04B 17/318* (2015.01)
*H04L 5/00* (2006.01)
*H04W 72/04* (2023.01)
*H04W 72/25* (2023.01)
*H04W 72/54* (2023.01)
*H04W 72/563* (2023.01)

(52) U.S. Cl.
CPC .......... *H04W 72/02* (2013.01); *H04B 17/328* (2023.05); *H04W 72/25* (2023.01); *H04W 72/54* (2023.01); *H04W 72/563* (2023.01)

(58) Field of Classification Search
CPC ..... H04W 72/02; H04W 92/18; H04W 76/14; H04W 72/23; H04W 72/20; H04W 4/40; H04W 72/0446; H04W 72/1263; H04W 4/46; H04W 72/04; H04W 4/70; H04W 72/21
See application file for complete search history.

(56) References Cited

U.S. PATENT DOCUMENTS

| | | |
|---|---|---|
| 2018/0042023 A1 | 2/2018 | Sheng |
| 2019/0174547 A1 | 6/2019 | Khoryaev et al. |
| 2020/0029245 A1 | 1/2020 | Khoryaev et al. |
| 2020/0068609 A1* | 2/2020 | Wang ............... H04W 72/02 |
| 2020/0178221 A1* | 6/2020 | Byun ............... H04W 4/08 |
| 2020/0178290 A1* | 6/2020 | Lee ............... H04W 72/20 |

(Continued)

FOREIGN PATENT DOCUMENTS

| | | |
|---|---|---|
| CN | 106686736 A | 5/2017 |
| CN | 107371193 A | 11/2017 |

(Continued)

*Primary Examiner* — Sai Aung
(74) *Attorney, Agent, or Firm* — Volpe Koenig

(57) ABSTRACT

A method for user equipment sidelink communication. The method includes: obtaining, by a first user equipment, a monitoring method of a second user equipment and/or a resource selecting method of the second user equipment, or indicating, by a second user equipment, its own monitoring method and/or resource selecting method.

20 Claims, 5 Drawing Sheets

(56) References Cited

U.S. PATENT DOCUMENTS

| | | | | |
|---|---|---|---|---|
| 2020/0229171 A1* | 7/2020 | Khoryaev | | H04W 4/40 |
| 2020/0314915 A1* | 10/2020 | Lin | | H04W 74/0833 |
| 2021/0321421 A1* | 10/2021 | Osawa | | H04W 72/56 |
| 2022/0368504 A1* | 11/2022 | Zhao | | H04L 1/1854 |
| 2023/0060746 A1* | 3/2023 | Park | | H04W 28/0289 |

FOREIGN PATENT DOCUMENTS

| | | |
|---|---|---|
| CN | 109891965 A | 6/2019 |
| CN | 110546968 A | 12/2019 |
| CN | 110574443 A | 12/2019 |
| CN | 110830952 A | 2/2020 |
| CN | 111132327 A | 5/2020 |
| CN | 111316675 A | 6/2020 |
| CN | 111901785 A | 11/2020 |
| WO | 2019/178749 A1 | 9/2019 |

* cited by examiner

Obtain a monitoring mode of a second user equipment and/or a resource selecting mode of the second user equipment by a first user equipment ⟋ 201

METHOD AND APPARATUS FOR USER EQUIPMENT SIDELINK COMMUNICATION, USER EQUIPMENT AND STORAGE MEDIUM

CROSS-REFERENCE TO RELATED APPLICATION

The present application is a U.S. National Stage of International Application No. PCT/CN2020/098226, filed on Jun. 24, 2020, the contents of all of which are incorporated herein by reference in their entirety for all purposes.

TECHNICAL FIELD

The disclosure relates to the user equipment sidelink communication technology, and particularly relates to a method and apparatus for user equipment sidelink communication, a user equipment, and a storage medium.

BACKGROUND

Surging new-generation Internet applications require a higher-level radio communication technology, thus promoting continuous evolution of the radio communication technology to satisfy demands of the applications. Especially a vehicle-to-everything (V2x) sidelink communication technology based on a 5th generation (5G) communication system can provide a higher communication rate, a shorter communication delay, and more reliable communication quality.

SUMMARY

In view of this, examples of the disclosure provide a method and apparatus for user equipment sidelink communication, a user equipment and a storage medium.

According to a first aspect of the examples of the disclosure, a method for user equipment sidelink communication is provided. The method includes:
  obtaining, by a first user equipment, a monitoring method of a second user equipment and/or a resource selecting method of the second user equipment.

According to a second aspect of the examples of the disclosure, a method for user equipment sidelink communication is provided. The method includes:
  indicating, by a second user equipment, its own monitoring method and/or resource selecting method.

According to a third aspect of the examples of the disclosure, a user equipment is provided. The user equipment includes a processor, a transceiver, a memory, and an executable program stored in the memory and capable of being operated by the processor, where the processor executes the steps of the method for user equipment sidelink communication when running the executable program.

According to a fourth aspect of the examples of the disclosure, a non-transitory computer-readable storage medium is provided. The storage medium stores an executable program, where the executable program implements the steps of the method for user equipment sidelink communication when being executed by a processor.

It is to be understood that the above general description and the following detailed description are merely illustrative and explanatory, and cannot limit the examples of the disclosure.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

The examples will be described in detail here and shown in the accompanying drawings illustratively. When the following descriptions relate to the accompanying drawings, unless otherwise specified, the same numeral in different accompanying drawings denotes the same or similar element. The implementations described in the following examples do not denote all implementations as the same as the examples of the disclosure. On the contrary, the implementations are merely examples of an apparatus and a method the same as some aspects of the examples of the disclosure as detailed in the appended claims.

The terms used in the examples of the disclosure are merely to describe the specific examples, instead of limiting the examples of the disclosure. The singular forms such as "a/an," "the," and "this" used in the examples of the disclosure and the appended claims are also intended to include the plural forms, unless otherwise clearly stated in the context. It is also to be understood that the term "and/or" used here refers to and includes any of one or more of the associated listed items or all possible combinations.

It is to be understood that although the terms such as first, second, and third may be used to describe various information in the examples of the disclosure, the information is not intended to be limited to the terms. The terms are merely used to distinguish the same type of information from other types of information. For example, without departing from the scope of the examples of the disclosure, the first information may also be called the second information, and similarly, the second information may also be called the first information. Depending on the context, the words "if" used here may be interpreted as "when," "while," or "in response to determining."

Figures 1, 2:
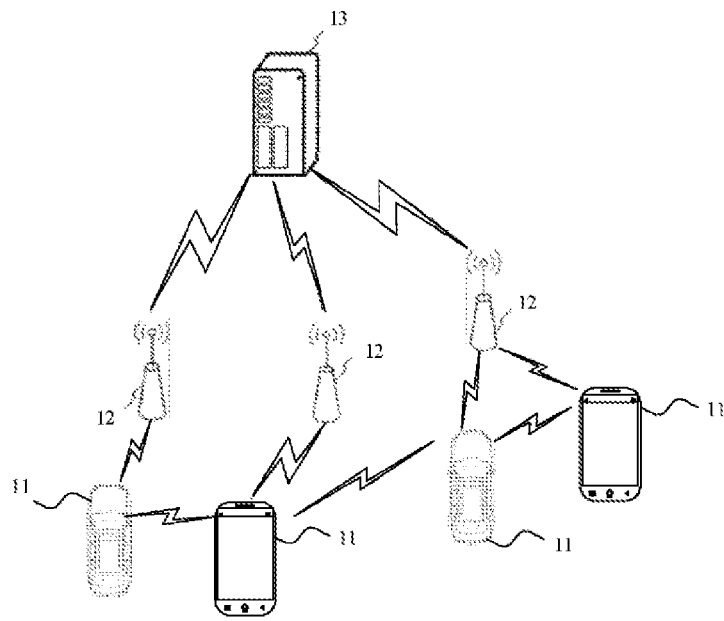
FIG. 1 is a schematic structural diagram of a system for radio communication according to in an example.
FIG. 2 is a schematic flow diagram of a method for user equipment sidelink communication according to an example.

FIG. 1 shows a schematic structural diagram of a radio communication system provided in an example of the disclosure. As shown in FIG. 1, the radio communication system is a communication system based on a cellular mobile communication technology. The radio communication system may include: several terminals 11 and several base stations 12.

The terminal 11 may refer to an equipment that provides voice and/or data connectivity for a user. The terminal 11 may be in communication with one or more core networks via a radio access network (RAN). The terminal 11 may be an Internet of Things terminal, such as a sensor device, a mobile telephone (also called a cellular telephone) or a computer having an Internet of Things terminal, which may be a fixed, portable, pocket, handheld, built-in or vehicular apparatus. The terminal may be a station (STA), a subscriber unit, a subscriber station, a mobile station, a mobile, a remote station, an access point, a remote terminal, an access terminal, a user terminal, a user agent, a user device or user equipment (UE). Or, the terminal 11 may also be an equipment of an unmanned aerial vehicle. Or, the terminal 11 may also be a vehicular device, which may be, for example, a vehicle computer having a radio communication function, or a radio communication device connected to the vehicle computer. Or, the terminal 11 may also be a roadside device, which may be, for example, a street lamp having a radio communication function, a signal lamp, or other roadside devices.

The base station 12 may be a network side device in a radio communication system. The radio communication system may be a 4th generation (4G) mobile communication system, which is also called a long term evolution (LTE) system; or, the radio communication system may also be a 5th generation (5G) mobile communication system, which is also called a new radio (NR) system or a 5G NR system. Or, the radio communication system may also be a next-generation system of the 5G system. An access network in the 5G system may be called a new generation-radio access network (NG-RAN). Or, the radio communication system may also be a machine type communication (MTC) system.

The base station 12 may be an evolved node B (eNB) used in the 4G system. Or, the base station 12 may also be a generation node B (gNB) with a central and distributed framework used in the 5G system. When using the central and distributed framework, the base station 12 usually includes a central unit (CU) and at least two distributed units (DUs). The central unit is provided with protocol stacks of a packet data convergence protocol (PDCP) layer, a radio link control (RLC) layer, and a media access control (MAC) layer; and the distributed unit is provided with a protocol stack of a physical (PHY) layer. A specific implementation of the base station 12 is not limited to the examples of the disclosure.

A radio connection may be established between the base station 12 and the terminal 11 by means of a radio air interface. In different examples, the radio air interface is a radio air interface based on a 4G standard; Or, the radio air interface is a radio air interface based on a 5G standard, such as new radio; Or, the radio air interface may further be a radio air interface based on a next-generation mobile communication network technology standard of 5G.

In some examples, an end-to-end (E2E) connection may be further established between the terminals 11, which may be vehicle-to-vehicle (V2V) communication, vehicle-to-infrastructure (V2I) communication, vehicle-to-pedestrian (V2P) communication, etc. in vehicle-to-everything (V2x).

In some examples, the radio communication system may further include a network management device 13.

Several base stations 12 are connected to the network management device 13 separately. The network management device 13 may be a core network device in the radio communication system. For example, the network management device 13 may be a mobility management entity (MME) in an evolved packet core (EPC). Or, the network management device may also be a serving gateway (SGW), a public data network gateway (PGW), a policy and charging rules function (PCRF), a home subscriber server (HSS) or other core network devices. An implementation form of the network management device 13 is not limited to the examples of the disclosure.

The execution entities involved in the examples of the disclosure include, but are not limited to, user equipment (UE) in a cellular mobile communication system, and a base station for cellular mobile communication.

Surging new-generation Internet applications require a higher-level radio communication technology, thus promoting the continuous evolution of the radio communication technology to satisfy the demands of the applications. Especially a vehicle-to-everything (V2x) sidelink communication technology based on a 5th generation (5G) communication system can provide a higher communication rate, a shorter communication delay, and more reliable communication quality. However, the current 5G V2x technology mainly considers communication between vehicular terminals, but fails to consider requirements, for example, power saving of handheld terminals or other terminals. At present, there is no relevant power-saving technical solution for handheld terminal communication for reference.

FIG. 2 is a schematic flow diagram of a user equipment sidelink communication method according to an example. As shown in FIG. 2, the user equipment sidelink communication method of the example of the disclosure includes the following processing steps:

step 201, a first user equipment obtains a monitoring method of a second user equipment and/or a resource selecting method of the second user equipment.

The monitoring method and/or the resource selecting method may include at least one of the monitoring method or the resource selecting method.

In the example of the disclosure, the monitoring method and/or the resource selecting method may include any one of the following methods.

A continuous channel monitoring method and a channel monitoring based resource selecting method: in the example of the disclosure, a user equipment supports a continuous channel monitoring method, that is, a resource reservation condition may be obtained in real time through continuous channel monitoring. Continuous channel monitoring is generally configured for a non-energy-saving user, that is, an ordinary user equipment. Since the non-energy-saving user may conduct more monitoring operations without considering its own energy consumption, resource reservation conditions of the nearby user equipment may be understood more comprehensively. Non-energy-saving user equipment includes a vehicular user equipment, etc. The user equipment may be directly connected to a vehicular power supply without considering its own energy consumption.

A part-time channel monitoring method and a part-time channel monitoring method based resource selecting method: the part-time channel monitoring method and the part-time channel monitoring based resource selecting method may be configured for an energy-saving user equipment. Through part-time channel monitoring method, a reservation condition of time frequency resources in a monitoring period may be obtained, such that a corresponding transmitted resource is selected for data to be transmitted. An interval channel monitoring mechanism is configured for a user equipment, the user equipment does not need to conduct continuous channel monitoring, such that energy saving is achieved.

A non-monitoring method and a random resource selecting method: in the example of the disclosure, the non-monitoring method and the random resource selecting method are configured for user equipment particularly requiring energy saving, such as a handheld user equipment, and a sensor and a relay device arranged in a power-free environment. Because of the difficulty in power supply, this kind of user equipment needs to be set in a channel-free monitoring method, and when there is data to be transmitted, time frequency resources are randomly selected for data transmission.

In the example of the disclosure, the first user equipment receives sidelink communication physical layer control information transmitted from the second user equipment via a sidelink communication physical control channel, and obtains the monitoring method of the second user equipment and/or the resource selecting method of the second user equipment according to the physical layer control information.

In some examples, the step that the monitoring method of the second user equipment and/or the resource selecting method of the second user equipment is obtained according to the physical layer control information may be achieved in any one of the following methods:

the first method: the physical layer control information includes an information field for indicating the monitoring method and/or the resource selecting method. A field may be reserved or added in the physical layer control information, so as to indicate the monitoring method and/or the resource selecting method.

The second method: the monitoring method of the second user equipment and/or the resource selecting method of the second user equipment is determined according to an information format of the physical layer control information.

The monitoring method of the user equipment and/or resource selecting method of the user equipment is indicated according to the information format of the physical layer control information (referred to as a control information format for short). For example, when a certain control information format is used, it is implied that the second user equipment uses a certain monitoring method and/or resource selecting method, but when a certain control information format is not used, it is implied that the second user equipment uses another monitoring method and/or resource selecting method. For another example, when a certain control information format is used, it is implied that the second user equipment uses a certain monitoring method and/or resource selecting method, but when another control information format is used, it is implied that the user equipment uses another monitoring method and/or resource selecting method.

In some examples, the physical layer control information may be divided into first physical layer control information and second physical layer control information, where the first physical layer control information includes a piece of indication information, and the indication information is used to indicate an information format of the second physical layer control information. Furthermore, the second physical layer control information may have various information formats, and different information formats include different combinations of information domains. The monitoring method of the second user equipment and/or the resource selecting method of the second user equipment may be implicitly indicated by the information format of the second physical layer control information. For example, the first physical layer control information includes N1 bits of indication information, where N1 is a positive integer, and a value of N1 bits is used to indicate an information format of the second physical layer control information. The monitoring method of the second user equipment and/or the resource selecting method of the second user equipment may be determined according to the information format of the second physical layer control information. The value of N1 is related to a type of an information format supported by the second physical layer control information.

The third method: the monitoring method of the second user equipment and/or the resource selecting method of the second user equipment is determined according to a second user equipment identity (ID) contained in the physical layer control information.

The second user equipment ID refers to ID information of a user equipment that transmits the physical layer control information. In some examples, a monitoring method corresponding to the identity information of the user equipment and/or resource selecting method corresponding to the identity information of the user equipment is determined as the monitoring method of the second user equipment and/or the resource selecting method of the second user equipment based on the identity information of the user equipment and a corresponding relation table between user equipment IDs and their monitoring methods and/or resource selecting methods. In some other examples, a type of the user equipment is determined based on the identity information of the user equipment, and further the monitoring method of a corresponding user equipment and/or the resource selecting method of a corresponding user equipment is determined based on the type of the user equipment. For example, the user equipment may be a vehicular device or a non-vehicular device, and different types of user equipment correspond to different monitoring methods and/or resource selecting methods.

In the example of the disclosure, the physical layer control information is transmitted via a physical layer sidelink control channel and/or a physical layer sidelink data channel.

As an implementation method, the monitoring method of the second user equipment and/or the resource selecting method of the second user equipment may also be obtained in the following method that the first user equipment receives MAC layer or radio resource control (RRC) layer control information transmitted from the second user equipment; and obtains the monitoring method of the second user equipment and/or the resource selecting method of the second user equipment according to the MAC layer or RRC layer control information. That is, a corresponding indication character is set in the MAC layer or RRC layer control information, to indicate the monitoring method of the user equipment and/or the resource selecting method of the user equipment, Or, the monitoring method of the user equipment and/or the resource selecting method of the user equipment is determined according to the identity information of the user equipment carried in the MAC layer or RRC layer control information.

Figure 3:
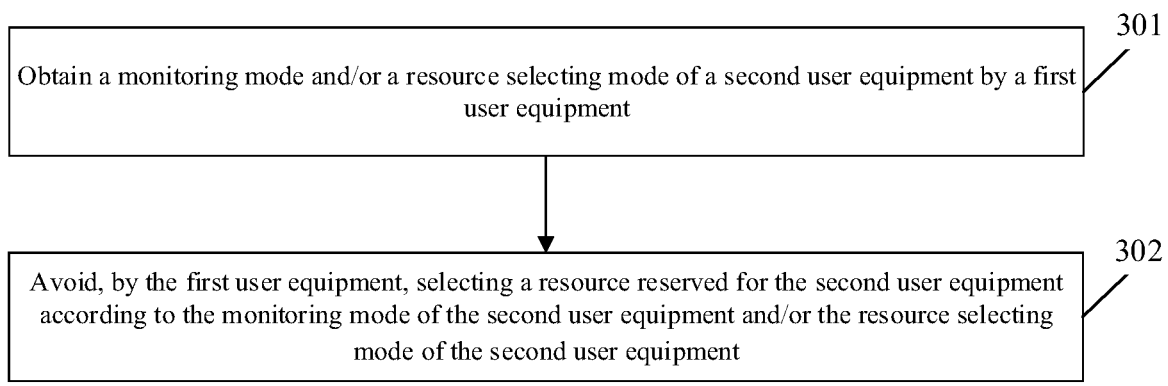
FIG. 3 is a schematic flow diagram of a method for resource determination according to an example.

As shown in FIG. 3, an example of the disclosure further provides a method for resource determination, which may avoid resource conflicts after determining a monitoring method of a second user equipment and/or a resource selecting method of a second user equipment. It is to be noted that the resource determination method of the example of the disclosure may be implemented in combination with each example of the above-mentioned user equipment sidelink communication method, may be implemented separately, and may be implemented in combination with any other technology.

As shown in FIG. 3, the resource determination method of the example of the disclosure includes:

Step 301, a first user equipment obtains a monitoring method and/or a resource selecting method of a second user equipment.

Step 302, the first user equipment avoids selecting a resource reserved by the second user equipment according to the monitoring method of the second user equipment and/or the resource selecting method of the second user equipment.

In the example of the disclosure, the resource includes at least one of a time domain resource, a frequency domain resource and a code domain resource.

In the example of the disclosure, step 301 may use the same methods as step 201 or not, to determine the monitoring method of the second user equipment and/or the resource selecting method of the second user equipment, which will not be limited to the example of the disclosure.

In the example of the disclosure, the first user equipment determines a first reference signal receiving power (RSRP) threshold according to the monitoring method of the second user equipment and/or the resource selecting method of the second user equipment. In some examples, different monitoring methods and/or resource selecting methods correspond to different first RSRP thresholds. The first user equipment avoids selecting a resource having a corresponding RSRP measurement value greater than or equal to the first RSRP threshold, that is, avoids selecting a resource reserved by the second user equipment. That is, in response to the first user equipment is expected to avoid occupying the resource reserved by the second user equipment, the first RSRP threshold needs to be set lower. The first user equipment avoids selecting the resource having the corresponding RSRP measurement value greater than the first RSRP threshold, such that the first user equipment may be prevented from occupying the resource reserved by the second user equipment. As an implementation method, the first user equipment determines values of the first RSRP threshold corresponding to different monitoring methods and/or resource selecting methods by receiving downlink control signaling from a network side device.

In some examples, in response to the first user equipment determines the resource reserved by the second user equipment according to the monitoring method of the second user equipment and/or the resource selecting method of the second user equipment, the first user equipment uses different first RSRP thresholds according to different monitoring methods of the second user and/or resource selecting methods of the second user equipment during resource exclusion. In some examples, the second user equipment may be an energy-saving user equipment or a non-energy-saving user equipment. In response to the second user equipment being an energy-saving user equipment, the first user equipment determines a low first RSRP threshold; and in response to the second user equipment being a non-energy-saving user equipment, the first user equipment determines a high first RSRP threshold. The low and high values are relative values. That is, the first RSRP threshold corresponding to the non-energy-saving user equipment is greater than the first RSRP threshold corresponding to the energy-saving user equipment. Generally speaking, in response to the second user equipment being an energy-saving user equipment, compared with the condition that the second user equipment is a non-energy-saving user equipment, the first user equipment uses a lower measurement threshold, that is, user equipment A is more inclined to avoid interference with user equipment B. In some examples, the first RSRP threshold of the energy-saving user equipment=the first RSRP threshold of the non-energy-saving user equipment (dBm)-offset (dB). In some examples, the offset may be a fixed value, such as 3 dB, Or, the offset may be determined according to a communication protocol, Or, the offset may be configured by a base station through signaling.

It is to be noted that in all the above examples of the disclosure, the first RSRP threshold corresponding to the first user equipment and the first RSRP threshold corresponding to the second user equipment may be configured separately. That is, the first RSRP thresholds corresponding to the first and second user equipment may be the same or not.

In all the above examples of the disclosure, the offset corresponding to the first user equipment and the offset corresponding to the second user equipment may be configured separately. That is, the offsets corresponding to the first and second user equipment may be the same or not.

In some other examples, the first user equipment determines a first priority threshold according to the monitoring method of the second user equipment and/or the resource selecting method of the second user equipment. The first user equipment reselects a resource in response to the priority of sidelink data transmission corresponding to the resource reserved by the second user equipment being higher than the first priority threshold.

It is to be noted that the priority is related to a priority number. In some examples, a greater priority number indicates lower priority, and a lower priority number indicates higher priority. Accordingly, the description that the priority is higher than the first priority threshold indicates that the priority number is lower than a priority number corresponding to the first priority threshold. In some other examples, a greater priority number indicates higher priority, and a smaller priority number indicates lower priority. Accordingly, the description that the priority is higher than the first priority threshold indicates that the priority number is greater than a priority number corresponding to the first priority threshold.

In an example, the energy-saving user equipment and the non-energy-saving user equipment correspond to different first RSRP thresholds. For example, according to the following table 1, the first RSRP threshold (referred to as "threshold" in the table for short) for resource exclusion is pre-configured or configured through downlink signaling. To-be-transmitted priority refers to the priority of sidelink data to be transmitted when the first user equipment selects a resource. Monitoring priority refers to the priority of sidelink transmission corresponding to monitored resource reserved by the second user equipment. For each priority combination, different first RSRP thresholds (referred to as "threshold" for short in the table) are configured according to whether the second user equipment uses an energy-saving monitoring method and/or an energy-saving resource selecting method.

TABLE 1

| | Monitoring priority p1 | | Monitoring priority p2 | | ... | | Monitoring priority pk | |
|---|---|---|---|---|---|---|---|---|
| | Energy-saving | Non-energy-saving | Energy-saving | Non-energy-saving | Energy-saving | Non-energy-saving | Energy-saving | Non-energy-saving |
| To-be-transmitted priority p1 | Threshold 11a | Threshold 11b | Threshold 12a | Threshold 12b | | | Threshold 1ka | Threshold 1kb |
| To-be-transmitted priority p2 | Threshold 21a | Threshold 21b | Threshold 22a | Threshold 22b | | | Threshold 2ka | Threshold 2kb |
| ... | | | | | | | | |
| To-be-transmitted priority pk | Threshold k1a | Threshold k1b | Threshold k2a | Threshold k2b | | | Threshold kka | Threshold kkb |

In some other examples, the first user equipment determines the monitoring method of the second user equipment and/or the resource selecting method of the second user equipment; and the resource reserved by the second user equipment is excluded in response to the second user equipment being the energy-saving user equipment. That is, all resources reserved by a second equipment having a type of an energy-saving user equipment cannot be used by the first user equipment. In this case, corresponding measurement operations on the resources reserved for energy-saving users may be reduced.

For example, the method of the example of the disclosure may be used for NR V2x. When selecting a resource, a user equipment may first exclude a resource according to a monitoring result. The resource exclusion is to exclude the candidate time frequency resources that overlap with time frequency resources reserved for other user equipment from a set of candidate time frequency resources that may be used for sidelink transmission. While monitoring the resources reserved for other user equipment, the user equipment may measure sidelink transmission of reserved resources, for example, measure reference signal receiving power. For better spatial multiplexing of time frequency resources, the user equipment may compare a monitoring measurement value with a measurement threshold, and only when the monitoring measurement value exceeds the measurement threshold, will the user equipment exclude the candidate time frequency resources that overlap with the corresponding reserved resources. A value of the measurement threshold may be configured through pre-configuration or downlink signaling of a base station. In addition, the user equipment may further adjust the measurement threshold according to the number of candidate time frequency resources after resource exclusion.

Figure 4:
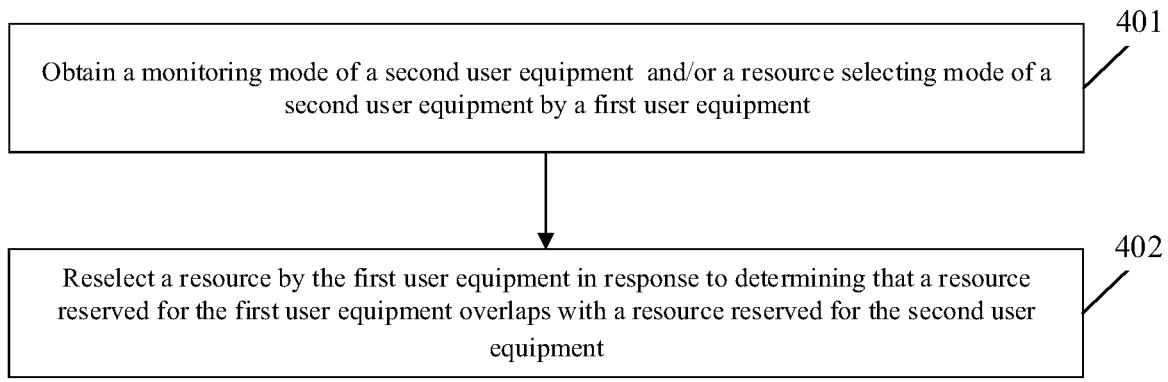
FIG. 4 is a schematic flow diagram of a method for resource conflict processing according to an example.

As shown in FIG. 4, an example of the disclosure further provides a resource conflict processing method. It is to be noted that the resource conflict processing method of the example of the disclosure may be implemented in combination with each example of the above-mentioned user equipment sidelink communication method and resource determination method, may be implemented separately, and may be implemented in combination with any other technology. The resource conflict processing method of the example of the disclosure may be illustratively used for a NR V2X technology or any other suitable technology. The resource conflict processing method of the example of the disclosure includes:

Step 401, a first user equipment determines a monitoring method of a second user equipment and/or a resource selecting method of a second user equipment.

Step 402, the first user equipment reselects a resource in response to a resource determined by the first user equipment overlapping with a resource determined by the second user equipment.

In any example of the disclosure, the resource determined by the first user equipment may be reserved through sidelink control information or not.

In the example of the disclosure, resource overlapping may be any one of partial resource overlapping and complete resource overlapping.

With the NR V2X technology as an example, due to incomplete monitoring of an energy-saving user equipment, the situation that a resource reserved by the energy-saving user equipment overlaps with resources already determined for other user equipment is more likely to occur. For example, in response to the second user equipment being an energy-saving user equipment, compared with the condition that the second user equipment is a non-energy-saving user equipment, the first user equipment is more inclined to select or reselect a resource by itself. That is, the first user equipment re-determines a resource of the first user equipment in response to the second user equipment being an energy-saving user equipment, and a resource reserved by the first user equipment overlapping with a resource reserved by the second user equipment. For another example, priority of sidelink transmission corresponding to the resource reserved by the first user equipment is determined; the priority of sidelink transmission corresponding to the resource reserved by the second user equipment is determined; and in response to the priority corresponding to the first user equipment being lower than that corresponding to the second user equipment, the first user equipment re-determines a resource of the first user equipment. In some examples, the resource re-determined by the first user equipment may also be a resource reserved by other user equipment. In this case, in response to the priority of sidelink transmission corresponding to the resource being lower than the priority of the sidelink transmission corresponding to the first user equipment, the first user equipment occupies the resources reserved for other equipment.

As an implementation method, the first user equipment may obtain values of a first priority threshold under different monitoring methods and/or resource selecting methods by receiving downlink control signaling from a network side device. Or, the first user equipment determines a second RSRP threshold according to the monitoring method of the second user equipment and/or the resource selecting method of the second user equipment. The first user equipment reselects a time frequency resource in response to an RSRP measurement value corresponding to the resource reserved by the second user equipment being greater than the second RSRP threshold. Under the condition that the monitoring method of the second user equipment and/or the resource selecting method of the second user equipment is the first method, the second RSRP threshold is Th1; and under the condition that the monitoring method of the second user equipment and/or the resource selecting method of the second user equipment is the second method, the second RSRP threshold is Th2. Th2 is set to be smaller than Th1, such that the first user equipment may avoid occupying a time frequency resource of the second user equipment under the condition that the monitoring method and/or the resource selecting method is the second method.

As an implementation method, values of the second RSRP threshold under different monitoring methods and/or resource selecting methods are further obtained by receiving downlink control signaling from a network side device.

As an implementation method, in response to the second user equipment being an energy-saving user, even if the priority of sidelink transmission corresponding to the resource reserved by the second user equipment is lower than or equal to the priority of the resource reserved by the first user equipment, the first user equipment may also be triggered to reselect a resource.

As another implementation method, in response to the priority of sidelink transmission corresponding to the resource reserved by the second user equipment being higher than or equal to the priority of sidelink transmission corresponding to the resource reserved by the first user equipment, the first user equipment reselects a resource.

As an implementation method, in response to the priority of sidelink transmission corresponding to the resource reserved by the second user equipment being lower than the priority of sidelink transmission corresponding to the resource reserved by the first user equipment, and a difference between priority of the first user equipment and the second user equipment is a K level, the first user equipment reselects a resource. A value of K may be obtained through pre-configuration or downlink signaling configuration. Only when the priority of the resource reserved by the first user equipment is lower than a certain priority threshold, the first user equipment may be triggered by reserved resources having lower priority to reselect a resource. The priority threshold may be obtained through pre-configuration or downlink signaling configuration.

In an example of the disclosure, a first RSRP threshold of corresponding resource reselection under the condition that the second user equipment is an energy-saving user equipment is smaller than a first RSRP threshold of corresponding resource reselection under the condition that the second user equipment is a non-energy-saving user equipment.

All the examples of the disclosure may further include the following methods:
first control information is transmitted, where the first control information at least includes a function for enabling or disabling any one of the above examples of the disclosure.

During enabling, different operations are conducted according to different monitoring methods and resource selecting methods of the user equipment having reserved resources; and during disabling, the same operation is conducted.

Figure 5:
FIG. 5 is a schematic flow diagram of a method for user equipment sidelink communication according to an example.

FIG. 5 is a schematic flow diagram of a method for user equipment sidelink communication according to an example. As shown in FIG. 5, the method for user equipment sidelink communication of the example of the disclosure includes:

Step 501, a second user equipment indicates its own monitoring method and/or resource selecting method.

In the example of the disclosure, the monitoring method and/or the resource selecting method includes:
a continuous channel monitoring method and a channel monitoring based resource selecting method: in the example of the disclosure, a user equipment supports a continuous channel monitoring method. That is, a resource reservation condition may be obtained in real time through continuous channel monitoring. Continuous channel monitoring is generally configured for a non-energy-saving user, that is, an ordinary user equipment. Since the non-energy-saving user may conduct more monitoring operations without considering its own energy consumption, resource reservation conditions of nearby user equipment may be understood more comprehensively. Non-energy-saving user equipment includes a vehicular user equipment, etc. The user equipment may be directly connected to a vehicular power supply without considering their own energy consumption.

A part-time channel monitoring method and a part-time channel monitoring based resource selecting method: the part-time channel monitoring method and the part-time channel monitoring based resource selecting method may be configured for an energy-saving user equipment. Through part-time channel monitoring, a reservation condition of time frequency resources in a monitoring period may be obtained, such that a corresponding transmitted resource is selected for data to be transmitted. An interval channel monitoring mechanism is configured for a user equipment, the user equipment does not need to conduct continuous channel monitoring, such that energy saving is achieved.

A non-monitoring method and a random resource selecting method: in the example of the disclosure, the non-monitoring method and the random resource selecting method is configured for user equipment particularly requiring energy saving, such as a handheld user equipment, and a sensor and a relay device arranged in a power-free environment. Because of the difficulty in power supply, this kind of user equipment need to be set in a channel-free monitoring method, and only when there is data to be transmitted, time frequency resources are randomly selected for data transmission.

The second user equipment indicates its own monitoring method and/or resource selecting method by transmitting physical layer control information.

The step that the second user equipment indicates its own monitoring method and/or resource selecting method includes the following steps that indicate a monitoring method and/or resource selecting method of the second user equipment via an information field in the first control information; or, the monitoring method of the second user equipment and/or the resource selecting method of the second user equipment is indicated by selecting an information format of the first control information; or, a second user equipment ID is carried in the first control information, where a user equipment type corresponding to the ID represents the monitoring method and/or the resource selecting method. The first control information is sidelink communication physical layer control information.

The monitoring method and/or the resource selecting method may include any one of the following methods:
the first method: the second user equipment sets an information field for indicating the monitoring method and/or the resource selecting method in the physical layer control information according to its own monitoring method and/or resource selecting method.

A field may be reserved or added in the physical layer control information, so as to indicate the monitoring method and/or the resource selecting method.

The second method: the corresponding information format of the physical layer control information is selected according to its own monitoring method and/or resource selecting method.

The monitoring method of the user equipment method and/or the resource selecting method of the user equipment is indicated according to the information format of the physical layer control information (referred to as a control information format for short). For example, when a certain control information format is used, it is implied that the second user equipment uses a certain monitoring method and/or resource selecting method, but when a certain control information format is not used, it is implied that the second user equipment uses another monitoring method and/or resource selecting method. For another example, when a certain control information format is used, it is implied that the second user equipment uses a certain monitoring method and/or resource selecting method, but when another control information format is used, it is implied that the user equipment uses another monitoring method and/or resource selecting method.

In some examples, the physical layer control information may be divided into first physical layer control information and second physical layer control information, where the first physical layer control information includes a piece of indication information, and the indication information is used to indicate an information format of the second physical layer control information. Furthermore, the second physical layer control information may have various information formats, and different information formats include different combinations of information domains. The monitoring method of a second user equipment and/or resource selecting method of the second user equipment may be implicitly indicated by the information format of the second physical layer control information. For example, the first physical layer control information includes N1 bits of indication information, where N1 is a positive integer, and a value of N1 bits is used to indicate an information format of the second physical layer control information. The monitoring method of a second user equipment and/or resource selecting method of the second user equipment may be determined according to the information format of the second physical layer control information. The value of N1 is related to a type of an information format supported by the second physical layer control information.

The third method: a second user equipment ID is carried in the physical layer control information, where a user equipment type corresponding to the ID represents the monitoring method and/or the resource selecting method.

The second user equipment ID refers to ID information of a user equipment that transmits the physical layer control information. In some examples, a monitoring method corresponding to the identity information of the user equipment and/or a resource selecting method corresponding to the identity information of the user equipment is determined as the monitoring method of the second user equipment and/or the resource selecting method of the second user equipment based on the identity information of the user equipment and a corresponding relation table between user equipment IDs and their monitoring methods and/or resource selecting methods. In some other examples, a type of the user equipment is determined based on the identity information of the user equipment, and further the monitoring method of a corresponding user equipment and/or resource selecting method of a corresponding user equipment is determined based on the type of the user equipment. For example, the user equipment may be a vehicular device or a non-vehicular device, and different types of user equipment correspond to different monitoring methods and/or resource selecting methods.

In the example of the disclosure, the physical layer control information is transmitted via a physical layer sidelink control channel and/or a physical layer sidelink data channel.

As an implementation method, the second user equipment sets its own monitoring method and/or resource selecting method in MAC layer control information or RRC layer control information. That is, a corresponding indication character is set in the MAC layer control information or the RRC layer control information, to indicate the monitoring method of the user equipment and/or resource selecting method of the user equipment, Or, the monitoring method of the user equipment and/or resource selecting method of the user equipment is determined according to the identity information of the user equipment carried in the MAC layer or RRC layer control information.

The essence of the technical solution of the disclosure is further described through a specific example.

In the next discussion of NR Sidelink, optimization of energy-saving of a user equipment will be conducted. Similar to LTE V2x, it may be considered to optimize energy consumption by reducing the monitoring time of a user. The reduction of monitoring time may also make an energy-saving user equipment fail to monitor some time frequency resource reservation information of other user equipment, resulting in an increase in resource collision and interference. Compared with an energy-saving user, a non-energy-saving user (that is, an ordinary user equipment) may conduct more monitoring operations, such that resource reservation conditions of the nearby user equipment may be understood more comprehensively. Since an energy-saving user may be unable to monitor a resource occupation behavior of other user equipment, the occupation of a resource reserved by an energy-saving user needs to be avoided. In addition, the energy-saving user may occupy time frequency resources already reserved for other users because the energy-saving user fails to monitor the resource reservation information of other users. In this case, other user equipment may actively select new time frequency resources because of resource occupation by the energy-saving user, so as to avoid interference. The user equipment reduces the occurrence of resource collision by distinguishing a user equipment of the monitored reserved resources and conducting different resource occupation and resource selecting operations.

User equipment A (that is, a first user equipment) uses different resource reselection and resource occupation methods according to different monitoring methods and/or resource selecting methods used by user equipment B (that is, a second user equipment) of the monitored reserved resources.

Considering that the user equipment B uses different monitoring methods and/or resource selecting methods mainly due to energy-saving requirements. Thus, for the sake of simplicity, in the example of the disclosure, sometimes user equipment using different monitoring methods and/or resource selecting methods are directly divided into energy-saving user equipment and non-energy-saving user equipment. An energy-saving user equipment may be understood as a user equipment using a first monitoring method optimized for energy saving and/or a first resource selecting method optimized for energy saving. A non-energy-saving user equipment may be understood as a user equipment using a second monitoring method not optimized for energy saving and/or a second resource selecting method not optimized for energy saving. However, it is not excluded to use different monitoring methods and/or resource selecting methods for other reasons, and to use different energy-saving optimization methods as different monitoring methods and/or resource selecting methods. For example, random selection and partial monitoring are different resource selecting methods for energy-saving optimization, and a user equipment may also use different resource reselection and resource occupation methods according to whether the transmission user equipment of the monitored reserved resources uses random selection or partial monitoring.

The user equipment A may determine a monitoring method used by the transmission user equipment B and/or a resource selecting method used by the transmission user equipment B of the monitored reserved resources in the following methods:

1) Physical layer control information including resource reservation information includes specific bits for identifying a monitoring method and/or a resource selecting method.

In NR V2x, the resource reservation information is included in a first part of sidelink control information and transmitted via a physical sidelink control channel. The first part of sidelink control information may include a new information domain to indicate different monitoring methods and/or resource selecting methods. For example, 1 bit is used to identify whether a user equipment uses an existing (R16 5G V2x) monitoring method and/or an existing (R16 5G V2x) resource selecting method or an energy-saving-optimized monitoring method and/or an energy-saving-optimized resource selecting method. For example, 2 bits are used to identify whether the user equipment uses an existing monitoring method and/or an existing monitoring resource selecting method, a random resource selecting method, or a resource selecting method based on partial monitoring.

2) A monitoring method and/or resource selecting method is implicitly identified according to different values of information domains in physical layer control information including resource reservation information.

A first part of sidelink control information has high requirements for transmission reliability, and the number of included information bits is limited strictly. Thus, some existing information bits in the first part of sidelink control information may be reused to implicitly indicate the monitoring method and/or resource selecting method. For example, the first part of sidelink control information may indicate second parts of sidelink control information having different formats. The second parts of sidelink control information having different formats have different information domains. A control information format of the second part used by a user equipment optimized for energy saving may be different from that of a user equipment not optimized for energy saving. In this case, the control information format of the second part indicated in the first part of control information may implicitly determine whether the monitoring method of the second user equipment and/or resource selecting method of the transmission user equipment is optimized for energy saving.

3) According to other information domains in physical layer control information that are transmitted together with the physical layer control information including resource reservation information, the monitoring method and/or resource selecting method is explicitly or implicitly identified.

Because the number of information bits in a first part of control information is limited, an information domain for indicating the monitoring method and/or resource selecting method may also be placed in a second part of control information transmitted via the same physical layer data channel as the first part of control information. Or, different monitoring methods and/or resource selecting methods are implicitly identified according to an identity of a second user equipment in the second part of control information. In this case, it is assumed that there are some mapping relations between identities and monitoring methods and/or resource selecting methods.

4) A monitoring method and/or resource selecting method is determined according to a user type of a second user equipment.

User equipment that needs energy-saving optimization and user equipment that do not need energy-saving optimization may have different user equipment capabilities and user equipment types. For example, for Internet of Vehicle applications, energy-saving user equipment are generally handheld devices, while non-energy-saving user equipment are generally vehicular devices. An upper layer (such as an MAC layer or RRC layer) of a user equipment may know equipment types of surrounding user equipment that conduct sidelink communication through high-layer signaling interaction, such as sidelink RRC, and inform a physical layer of a mapping relation between equipment types and equipment identities. The physical layer determines whether to conduct energy-saving optimization according to an equipment type.

In the example of the disclosure, the user equipment A reselects different resources according to different monitoring methods and/or resource selecting methods used by the user equipment B of the monitored reserved resources.

In NR V2x, when selecting a resource, a user equipment may first exclude a resource according to a monitoring result. The resource exclusion is to exclude the candidate time frequency resources that overlap with time frequency resources reserved for other user equipment from a set of candidate time frequency resources that may be used for sidelink transmission. While monitoring resources reserved for other user equipment, the user equipment may measure sidelink transmission of the reserved resources, for example, measure reference signal receiving power. For better spatial multiplexing of time frequency resources, the user equipment may compare a monitoring measurement value with a measurement threshold, and only when the monitoring measurement value exceeds the measurement threshold, will the user equipment exclude the candidate time frequency resources that overlap with the corresponding reserved resources. A value of the measurement threshold may be configured through pre-configuration or downlink signaling of a base station. In addition, the user equipment may further adjust the measurement threshold according to the number of candidate time frequency resources after resource exclusion.

In view of this, in response to the user equipment A monitoring a resource reserved by the user equipment B, the user equipment A uses different measurement thresholds (that is, first RSRP thresholds in the above solution) according to different monitoring methods and/or resource selecting methods of the user equipment B during resource exclusion.

Generally speaking, in response to the user equipment B being an energy-saving user equipment, compared with the condition that the user equipment B is a non-energy-saving user equipment, the user equipment A uses a lower measurement threshold, that is, the user equipment A is more inclined to avoid interference with the user equipment B.

As an implementation method, respective measurement thresholds may be configured for energy-saving equipment and non-energy-saving user equipment. For example, according to the above table 1, the measurement threshold for resource exclusion is pre-configured or configured through downlink signaling. To-be-transmitted priority refers to the priority of sidelink data to be transmitted when the user equipment A selects a resource. Monitoring priority refers to the priority of sidelink transmission corresponding to monitored resource reserved by the user equipment B. For each priority combination, different measurement thresholds (referred to as "threshold" for short) are configured according to whether the user equipment B uses an energy-saving monitoring method and/or data selection method.

As another implementation method, compared with the non-energy-saving user equipment, a resource reserved by the energy-saving user equipment is excluded by decreasing a used measurement threshold by an offset, that is, the measurement threshold of the energy-saving user equipment=the measurement threshold of the non-energy-saving user equipment (dBm)-offset (dB).

In some examples, the offset may be a fixed value, such as 3 dB, Or, the offset may be configured through pre-configuration or base station downlink signaling.

As another implementation method, resources reserved for all users optimized for energy saving are excluded. In this case, corresponding measurement operations on the resources reserved for energy-saving users may be reduced.

In NR V2x, resource occupation of low-priority sidelink data transmission by high-priority sidelink data transmission is supported. In response to the user equipment A finding that the resource reserved by the user equipment B overlaps with own previous reserved resource in time frequency resources through monitoring, sidelink transmission priority corresponding to the resource reserved by the user equipment B is higher than own sidelink transmission priority, and the RSRP measurement value corresponding to the resource reserved by the user equipment B exceeds a measurement threshold, the user equipment A reselects a resource, and no longer uses a previously reserved resource for transmission.

As an energy-saving user equipment is more likely to select a time frequency resource already reserved for another user equipment to conduct transmission because of incomplete monitoring, in response to the user equipment B being an energy-saving user equipment, compared with the condition that the user equipment B is a non-energy-saving user equipment, the user equipment A is more inclined to trigger resource reselection.

As an implementation method, in response to the user equipment B being an energy-saving user, even if the priority of sidelink transmission corresponding to the resource reserved by the user equipment B is lower than or equal to the priority of the resource reserved by the user equipment A, resource (re-) selection of the user equipment A may also be triggered. In response to the priority of sidelink transmission corresponding to the resource reserved by the user equipment B being not lower than priority level K of the resource reserved by the user equipment A, the user equipment A may (re-) select a resource. A value of K may be obtained through pre-configuration or downlink signaling configuration. Only when the priority of the resource reserved by the user equipment A is lower than a certain priority threshold, the user equipment A may be triggered by a reserved resource having lower priority to reselect a resource. The priority threshold may be obtained through pre-configuration or downlink signaling configuration.

As another implementation method, in response to the user equipment B being an energy-saving user equipment, its reserved resource triggers the user equipment A to (re-) select a resource with a smaller measurement threshold. The measurement thresholds of the user equipment A and the user equipment B may be configured or pre-configured separately, Or, an offset between two different measurement thresholds may be configured or pre-configured.

As another implementation method, the technical solution of the examples of the disclosure may also be enabled or disabled through configuration or pre-configuration. That is, when the user equipment receives an enabling instruction, the user equipment sidelink communication method of the example of the disclosure of the user equipment is started, and when the user equipment receives a disabling instruction, the user equipment sidelink communication method of the example of the disclosure of the user equipment is stopped.

In the example of the disclosure, configurations of enabling and disabling the example of the disclosure may be based on cells, carriers, sidelink band width parts (BWPs), or sidelink resource pools.

According to the method for user equipment sidelink communication provided by the examples of the disclosure, the first user equipment obtains the monitoring method of the second user equipment and/or the resource selecting method of the second user equipment, and a transmission resource occupation strategy of the first user equipment is determined based on the monitoring method of the second user equipment and/or the resource selecting method of the second user equipment. The examples of the disclosure fully consider that an energy-saving user equipment is more likely to select a time frequency resource already reserved for another user equipment to conduct data transmission because of an incomplete monitoring method. In this way, considering a time frequency resource already occupied by the energy-saving user equipment, a non-energy-saving user equipment may be more inclined to trigger resource reselection when selecting a time frequency resource, so as to avoid occupying the time frequency resource already occupied by the energy-saving user equipment to the greatest extent. A technical solution of the examples of the disclosure may fully ensure that when the energy-saving user equipment occupies a time frequency resource reserved by another non-energy-saving user equipment, the energy-saving user equipment reselects a time frequency resource for data transmission to the greatest extent, without occupying a time frequency resource occupied by the energy-saving user equipment, such that communication efficiency of the energy-saving user equipment is ensured, and unnecessary energy consumption caused when the energy-saving user equipment reselects a resource because a transmission resource is occupied is prevented.

Figure 6:
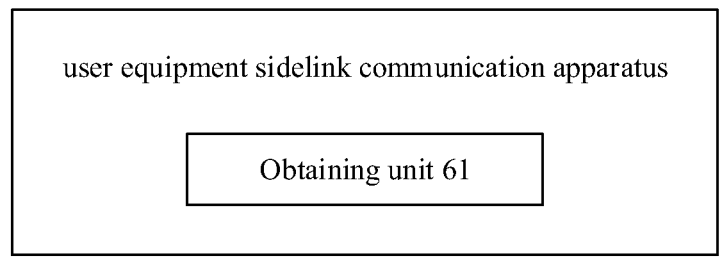
FIG. 6 is a schematic structural diagram of composition of an apparatus for user equipment sidelink communication according to an example.

FIG. 6 is a schematic structural diagram of composition of an apparatus for user equipment sidelink communication according to an example. As shown in FIG. 6, the user equipment sidelink communication apparatus of the example of the disclosure is configured in a first user equipment, and includes:

an obtaining unit 61 configured to obtain a monitoring method of a second user equipment and/or a resource selecting method of a second user equipment.

In some examples, the obtaining unit 61 is further configured to:

determine the monitoring method of the second user equipment and/or the resource selecting method of the second user equipment according to an information field for indicating the monitoring method in a first control information and/or the resource selecting method in the first control information; Or, determine the monitoring method of the second user equipment and/or the resource selecting method of the second user equipment according to an information format of the first control information; Or, determine the monitoring method of the second user equipment and/or the resource selecting method of the second user equipment according to a second user equipment ID contained in the first control information. The first control information is sidelink communication physical layer control information.

Based on the user equipment sidelink communication apparatus shown in FIG. 6, the user equipment sidelink communication apparatus of the example of the disclosure further includes:

a transmission unit (not shown in FIG. 6) configured to transmit the physical layer control information via a physical layer sidelink control channel and/or a physical layer sidelink data channel.

Based on the user equipment sidelink communication apparatus shown in FIG. 6, the user equipment sidelink communication apparatus of the example of the disclosure further includes:

a reception unit (not shown in FIG. 6) configured to receive MAC layer control information or RRC layer control information transmitted from the second user equipment.

The obtaining unit 61 is further configured to obtain the monitoring method of the second user equipment and/or the resource selecting method of the second user equipment according to the MAC layer or RRC layer control information.

Based on the user equipment sidelink communication apparatus shown in FIG. 6, the user equipment sidelink communication apparatus of the example of the disclosure further includes:

a resource selecting unit (not shown in FIG. 6) configured to determine a resource of the first user equipment according to the monitoring method of the second user equipment and/or the resource selecting method of the second user equipment, where the resource of the first user equipment does not overlap with a resource reserved by the second user equipment.

In some examples, the resource selecting unit is further configured to determine a first RSRP threshold according to the monitoring method of the second user equipment and/or the resource selecting method of the second user equipment; and to select a resource that has a corresponding measurement value smaller than the first RSRP threshold and is reserved by the second user equipment, Or, to select a resource having a corresponding measurement value equal to the first RSRP threshold.

In some examples, the resource selecting unit is further configured to receive values of the first RSRP threshold under different monitoring methods and/or resource selecting methods transmitted from a network side device; Or, determine values of the first RSRP threshold corresponding to the different monitoring methods and/or resource selecting methods according to a communication protocol.

In some examples, the resource selecting unit is further configured to re-determine a resource in response to a resource reserved by the second user equipment overlapping with a resource reserved by the first user equipment.

In some examples, the resource selecting unit is further configured to determine a first priority threshold according to the monitoring method of the second user equipment and/or the resource selecting method of the second user equipment.

The first user equipment reselects a resource in response to the priority of sidelink data transmission corresponding to the resource reserved by the second user equipment being higher than the first priority threshold.

In some examples, the resource selecting unit is further configured to receive values of the first priority threshold under different monitoring methods and/or resource selecting methods transmitted from a network side device.

In some examples, the resource selecting unit is further configured to determine a second RSRP threshold according to the monitoring method of a second user equipment and/or resource selecting method of the second user equipment.

The first user equipment reselects a resource in response to an RSRP measurement value corresponding to a resource reserved by the second user equipment that is greater than the second RSRP threshold.

In some examples, the resource selecting unit is further configured to receive values of the second RSRP threshold under different monitoring methods and/or resource selecting methods transmitted from a network side device.

In some examples, the monitoring method and/or resource selecting method includes:

a continuous channel monitoring method and a channel monitoring based resource selecting method; or a part-time channel monitoring method and a part-time channel monitoring based resource selecting method; or a non-monitoring method and a random resource selecting method.

In an example, the obtaining unit 61, the reception unit, the transmission unit, the resource selecting unit, etc., may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), and microprocessors, or other electronic components, or by one or more radio frequency (RF) antennas, thus executing the above-mentioned user equipment sidelink communication method.

In the examples of the disclosure, a specific operation execution method of each module and each unit of the user equipment sidelink communication apparatus shown in FIG. 6 is described in detail in the examples relating to the method, and will not be repeated here.

Figure 7:
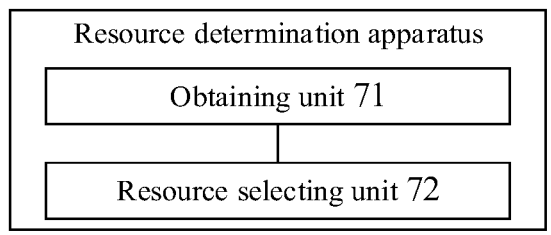
FIG. 7 is a schematic structural diagram of composition of an apparatus for resource determination according to an example.

FIG. 7 is a schematic structural diagram of the composition of a resource determination apparatus according to an example. As shown in FIG. 7, the resource determination apparatus of the example of the disclosure is configured in a first user equipment, and includes:

an obtaining unit 71 configured to obtain a monitoring method of a second user equipment and/or resource selecting method of a second user equipment, and a resource selecting unit 72 configured to avoid selecting a resource reserved by the second user equipment according to the monitoring method of the second user equipment and/or the resource selecting method of the second user equipment.

In the example of the disclosure, the resource includes at least one of a time domain resource, a frequency domain resource and a code domain resource.

In the example of the disclosure, the resource selecting unit 72 determines a first RSRP threshold according to the monitoring method of the second user equipment and/or the resource selecting method of the second user equipment. In some examples, different monitoring methods and/or resource selecting methods correspond to different first RSRP thresholds. The first user equipment avoids selecting a resource having a corresponding RSRP measurement value greater than or equal to the first RSRP threshold, that is, avoids selecting a resource reserved by the second user equipment. That is, in response to the first user equipment being expected to avoid occupying the resource reserved by the second user equipment, the first RSRP threshold needs to be set lower. The first user equipment avoids selecting the resource having the corresponding RSRP measurement value greater than the first RSRP threshold, such that the first user equipment may be prevented from occupying the resource reserved by the second user equipment. As an implementation method, the first user equipment determines values of the first RSRP threshold corresponding to different monitoring methods and/or resource selecting methods by receiving downlink control signaling from a network side device.

In an example, the obtaining unit 71 and the resource selecting unit 72 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), and microprocessors, or other electronic components, or by one or more radio frequency (RF) antennas, thus executing the above-mentioned user equipment sidelink communication method.

In the examples of the disclosure, a specific operation execution method of each module and each unit of the resource determination apparatus shown in FIG. 7 is described in detail in the examples relating to the method, and will not be repeated here.

Figure 8:
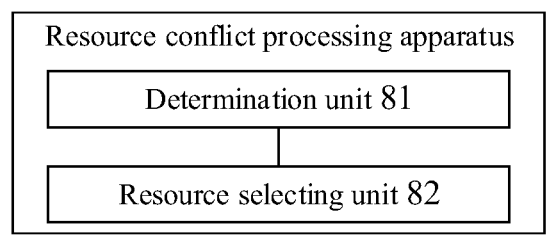
FIG. 8 is a schematic structural diagram of composition of an apparatus for resource conflict processing according to an example.

FIG. 8 is a schematic structural diagram of the composition of a resource conflict processing apparatus according to an example. As shown in FIG. 8, the resource conflict processing apparatus of the example of the disclosure is configured in a first user equipment, and includes:
- a determination unit 81 configured to determine a monitoring method of a second user equipment and/or a resource selecting method of the second user equipment, and
- a resource selecting unit 82 configured to make the first user equipment reselect a resource in response to a resource reserved by the first user equipment overlapping with a resource reserved by the second user equipment.

In the example of the disclosure, resource overlapping may be any one of partial resource overlapping and complete resource overlapping.

With the NR V2X technology as an example, due to incomplete monitoring of an energy-saving user equipment, the situation that a resource reserved by the energy-saving user equipment overlaps with resources already determined for other user equipment is more likely to occur. For example, in response to the second user equipment being an energy-saving user equipment, compared with the condition that the second user equipment is a non-energy-saving user equipment, the first user equipment is more inclined to select or reselect a resource by itself. That is, the first user equipment re-determines a resource of the first user equipment in response to the second user equipment being an energy-saving user equipment, and a resource reserved by the first user equipment overlapping with a resource reserved by the second user equipment. For another example, priority of sidelink transmission corresponding to the resource reserved by the first user equipment is determined; the priority of sidelink transmission corresponding to the resource reserved by the second user equipment is determined; and in response to the priority corresponding to the first user equipment being lower than that corresponding to the second user equipment, the first user equipment re-determines a resource of the first user equipment. In some examples, the resource re-determined by the first user equipment may also be a resource reserved by other user equipment. In this case, in response to the priority of sidelink transmission corresponding to the resource being lower than the priority of the sidelink transmission corresponding to the first user equipment, the first user equipment occupies the resources reserved for other equipment.

In an example, the determination unit 81 and the resource selecting unit 82 may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), and microprocessors, or other electronic components, or by one or more radio frequency (RF) antennas, thus executing the above-mentioned user equipment sidelink communication method.

In the examples of the disclosure, a specific operation execution method of each module and each unit of the resource conflict processing apparatus shown in FIG. 8 is described in detail in the examples relating to the method, and will not be repeated here.

Figure 9:
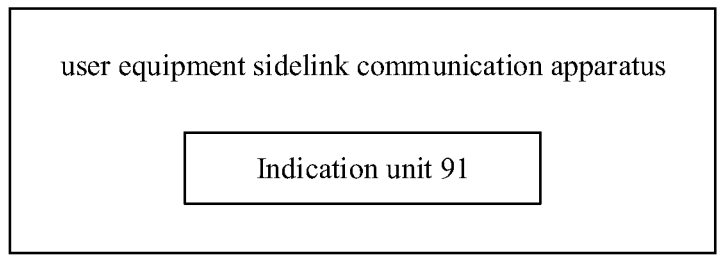
FIG. 9 is a schematic structural diagram of composition of an apparatus for user equipment sidelink communication according to an example.

FIG. 9 is a schematic structural diagram of the composition of a user equipment sidelink communication apparatus according to an example. As shown in FIG. 9, the user equipment sidelink communication apparatus of the example of the disclosure is configured in a second user equipment, and includes:
- an indication unit 91 configured to indicate a monitoring method of the second user equipment and/or a resource selecting method of the second user equipment.

The indication unit 91 is further configured to:
- indicate the monitoring method of the second user equipment and/or the resource selecting method of the second user equipment via an information field in a first control information; or,
- select an information format of the first control information to indicate the monitoring method of the second user equipment and/or the resource selecting method of the second user equipment; or,
- carry a second user equipment ID in the first control information, where a user equipment type corresponding to the ID represents the monitoring method and/or resource selecting method. The first control information is sidelink communication physical layer control information.

Based on the user equipment sidelink communication apparatus shown in FIG. 9, the user equipment sidelink communication apparatus of the example of the disclosure further includes:
- a transmission unit (not shown in FIG. 9) configured to transmit the sidelink communication physical layer control information via a physical layer sidelink control channel and/or a physical layer sidelink data channel.

Based on the user equipment sidelink communication apparatus shown in FIG. 9, the user equipment sidelink communication apparatus of the example of the disclosure further includes:

a setting unit configured to set the monitoring method of the second user equipment and/or the resource selecting method of the second user equipment in MAC layer control information or RRC layer control information.

In the example of the disclosure, the monitoring method and/or resource selecting method includes:

a continuous channel monitoring method and a channel monitoring based resource selecting method; or a part-time channel monitoring method and a part-time channel monitoring based resource selecting method; or a non-monitoring method and a random resource selecting method.

In an example, the indication unit 91, the transmission unit, the setting unit, etc., may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), and microprocessors, or other electronic components, or by one or more radio frequency (RF) antennas, thus executing the above-mentioned user equipment sidelink communication method.

In the examples of the disclosure, a specific operation execution method of each module and each unit of the user equipment sidelink communication apparatus shown in FIG. 9 is described in detail in the examples relating to the method, and will not be repeated here.

Figure 10:
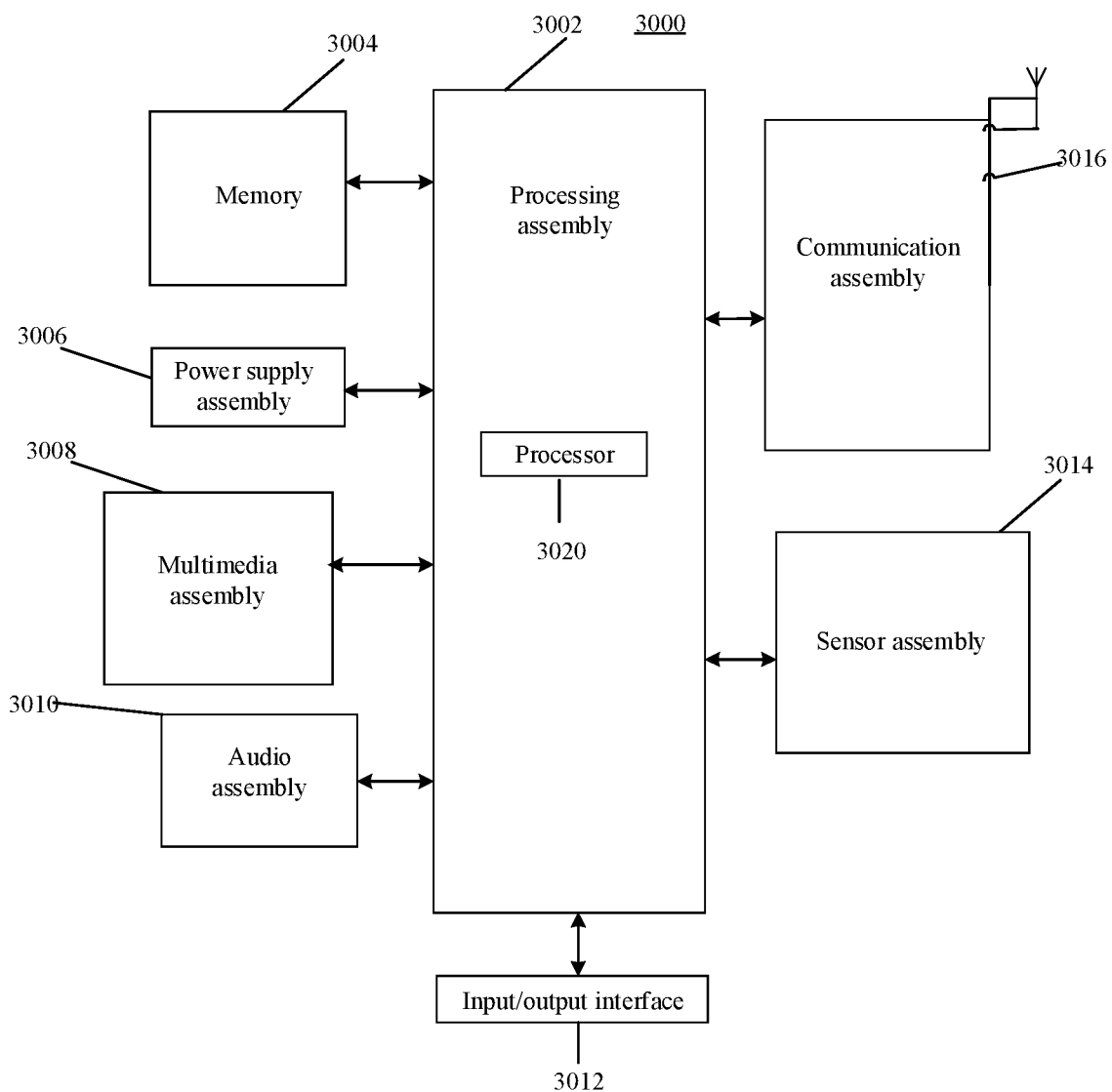
FIG. 10 is a schematic structural diagram of composition of a user equipment according to an example.

FIG. 10 is a block diagram of a user equipment 3000 according to an example. For example, the user equipment 3000 may be a mobile phone, a computer, a digital broadcast terminal, a messaging device, a game console, a tablet device, a medical device, a fitness device, a personal digital assistant, etc.

With reference to FIG. 10, the user equipment 3000 may include one or more of the following assemblies: a processing assembly 3002, a memory 3004, a power supply assembly 3006, a multimedia assembly 3008, an audio assembly 3010, an input/output (I/O) interface 3012, a sensor assembly 3014, and a communication assembly 3016.

The processing assembly 3002 generally controls all operations of the user equipment 3000, such as operations associated with display, telephone call, data communication, camera operation and recording operations. The processing assembly 3002 may include one or more processors 3020 for executing an instruction, so as to complete all or part of the steps of the method. In addition, the processing assembly 3002 may include one or more modules to facilitate interactions between the processing assembly 3002 and other assemblies. For example, the processing assembly 3002 may include a multimedia module to facilitate an interaction between the multimedia assembly 3008 and the processing assembly 3002.

The memory 3004 is configured to store various types of data to support the operations on the equipment 3000. Examples of the data include an instruction for any application or method operating on the user equipment 3000, contact data, phone book data, a message, a picture, a video, etc. The memory 3004 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply assembly 3006 supplies power to various assemblies of the user equipment 3000. The power supply assembly 3006 may include a power management system, one or more power supplies, and other assemblies associated with generating, managing and distributing power for the user equipment 3000.

The multimedia assembly 3008 includes a screen that provides an output interface between the user equipment 3000 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touching, sliding and gestures on the touch panel. The touch sensor may sense a boundary of a touching or sliding operation, and further measure a duration and pressure related to the touching or sliding operation. In some examples, the multimedia assembly 3008 includes a front camera and/or a back camera. When the equipment 3000 is in an operation mode, such as a shooting mode or a video mode, the front camera and/or the back camera are/is capable of receiving external multimedia data. Each of the front camera and the back camera may be a fixed optical lens system or have a focal length and optical zoom capability.

The audio assembly 3010 is configured to output and/or input an audio signal. For instance, the audio assembly 3010 includes a microphone (MIC) configured to receive an external audio signal when the user equipment 3000 is in the operational mode, for instance, a calling mode, a recording mode, and a speech recognition mode. The received audio signal may be further stored in the memory 3004 or transmitted via the communication assembly 3016. In some examples, the audio assembly 3010 further includes a speaker for outputting an audio signal.

The I/O interface 3012 provides an interface between the processing assembly 3002 and a peripheral interface module. The peripheral interface module may be a keyboard, a click wheel, a button, etc. The buttons may include, but are not limited to, a home button, a volume button, a start button and a lock button.

The sensor assembly 3014 includes one or more sensors for providing state assessments of various aspects for the user equipment 3000. For example, the sensor assembly 3014 is capable of detecting an on/off state of the equipment 3000 and the relative positioning of the assemblies, such as a display and a keypad of the user equipment 3000, and the sensor assembly 3014 is further capable of detecting position change of the user equipment 3000 or an assembly of the user equipment 3000, presence or absence of contact between the user and the user equipment 3000, an orientation or acceleration/deceleration of the user equipment 3000, and temperature change of the user equipment 3000. The sensor assembly 3014 may include a proximity sensor configured to detect the presence of a nearby object without any physical contact. The sensor assembly 3014 may further include an optical sensor, such as a complementary metal-oxide-semiconductor (CMOS) or charge-coupled device (CCD) image sensor, which is used in imaging applications. In some examples, the sensor assembly 3014 may further include an acceleration sensor, a gyroscope sensor, a magnetic sensor, a pressure sensor or a temperature sensor.

The communication assembly 3016 is configured to facilitate wired or wireless communication between the user equipment 3000 and other equipment. The user equipment 3000 may access a wireless network based on a communication standard, such as WiFi, the 2nd generation (2G) mobile communication technology or the 3rd generation (3G) mobile communication technology, or their combination. In an example, the communication assembly 3016 receives a broadcast signal or broadcast related information from an external broadcast management system via a broadcast channel. In an example, the communication assembly 3016 further includes a near field communication (NFC) module, to facilitate short-distance communication. For example, the NFC module may be implemented based on a radio frequency identification (RFID) technology, an infrared data association (IrDA) technology, an ultra wide band (UWB) technology, a Bluetooth (BT) technology, etc.

In an example, the user equipment 3000 may be implemented by one or more ASICS, DSPs, digital signal processing devices (DSPDs), PLDs, FPGAs, controllers, microcontrollers, and microprocessors or other electronic components, thus executing the above-mentioned user equipment sidelink communication method, resource determination method and resource conflict processing method.

In an example, there is further provided a non-transitory computer-readable storage medium including an instruction, such as the memory 3004 including an instruction. The instruction may be executed by the processor 3020 of the user equipment 3000 so as to complete the above-mentioned user equipment sidelink communication method, resource determination method and resource conflict processing method. For example, the non-transitory computer-readable storage medium may be an ROM, RAM, a compact disk (CD)-ROM, a magnetic tape, a floppy disk, an optical data storage device, etc.

Those skilled in the art could easily conceive of other implementation solutions of the examples of the disclosure upon consideration of the description and practice of the disclosure. The disclosure is intended to cover any variations, uses or adaptive changes of the examples of the disclosure, and these variations, uses or adaptive changes follow the general principles of the examples of the disclosure and include common general knowledge or conventional technical means that is not disclosed in the examples of the disclosure. The description and the examples are to be regarded as illustrative only, and the true scope and spirit of the examples of the disclosure are indicated by the following claims.

It is to be understood that the examples of the disclosure are not limited to precise structures which have been described above and shown in the accompanying drawings, and can be modified and changed in various ways without departing from its scope. The scope of the examples of the disclosure is limited by the appended claims.

Additional non-limiting examples of the disclosure include:

According to a first aspect of the examples of the disclosure, there is provided a method for user equipment sidelink communication. The method includes:
  obtaining, by a first user equipment, a monitoring method of a second user equipment and/or a resource selecting method of the second user equipment.

In the above solution, the obtaining, by a first user equipment, a monitoring method of a second user equipment and/or a resource selecting method of the second user equipment includes any one of the following actions:
  determining the monitoring method of the second user equipment and/or the resource selecting method of the second user equipment according to an information field for indicating the monitoring method in a first control information and/or the resource selecting method in the first control information;
  determining the monitoring method of the second user equipment and/or the resource selecting method of the second user equipment according to an information format of the first control information; or,
  determining the monitoring method of the second user equipment and/or the resource selecting method of the second user equipment according to a second user equipment identity (ID) contained in the first control information.

In the above solution, the first control information is sidelink communication physical layer control information.

In the above solution, the physical layer control information is transmitted via a physical layer sidelink control channel and/or a physical layer sidelink data channel.

In the above solution, wherein obtaining, by a first user equipment, at least one of a monitoring method of a second user equipment or a resource selecting method of a second user equipment includes:
  obtaining, by the first user equipment, the monitoring method of the second user equipment and/or the resource selecting method of the second user equipment according to received media access control (MAC) layer control information or radio resource control (RRC) layer control information.

In the above solution, the method further includes:
  determining, by the first user equipment, a resource of the first user equipment according to the monitoring method of the second user equipment and/or the resource selecting method of the second user equipment, wherein the resource of the first user equipment does not overlap with a resource reserved by the second user equipment.

In the above solution, wherein determining, by the first user equipment, a resource of the first user equipment according to the monitoring method of the second user equipment and/or the resource selecting method of the second user equipment includes:
  determining, by the first user equipment, a first reference signal receiving power (RSRP) threshold, according to the monitoring method of the second user equipment and/or the resource selecting method of the second user equipment; and
  avoiding, by the first user equipment, selecting a resource that has a corresponding measurement value greater than the first RSRP threshold and is reserved by the second user equipment, or, avoiding, by the first user equipment, selecting a resource having a corresponding measurement value equal to the first RSRP threshold.

In the above solution, the method further includes:
  receiving values of the first RSRP threshold corresponding to different monitoring methods and/or resource selecting methods transmitted from a network side device; or,
  determining values of the first RSRP threshold corresponding to the different monitoring methods and/or resource selecting methods according to a communication protocol.

In the above solution, the method further includes:
redetermining a resource by the first user equipment in response to a resource reserved by the second user equipment overlapping with a resource determined by the first user equipment.

In the above solution, redetermining a resource by the first user equipment includes:
determining, by the first user equipment, a first priority threshold according to the monitoring method of the second user equipment and/or the resource selecting method of the second user equipment, and
reselecting, by the first user equipment, a resource in response to priority of direct data transmission corresponding to the resource reserved by the second user equipment being higher than the first priority threshold.

In the above solution, the method further includes:
receiving values of the first priority threshold under different monitoring methods transmitted and/or resource selecting methods transmitted from a network side device.

In the above solution, redetermining a resource by the first user equipment includes:
determining, by the first user equipment, a second RSRP threshold according to the monitoring method of the second user equipment and/or the resource selecting method of the second user equipment, and
reselecting, by the first user equipment, a resource in response to an RSRP measurement value corresponding to a resource reserved by the second user equipment being greater than the second RSRP threshold.

In the above solution, the method further includes:
receiving values of the second RSRP threshold under different monitoring methods and/or resource selecting methods transmitted from a network side device.

In the above solution, the monitoring method and/or the resource selecting method includes:
a continuous channel monitoring method and a channel monitoring based resource selecting method; or
a part-time channel monitoring method and a part-time channel monitoring based resource selecting method; or a non-monitoring method and a random resource selecting method.

According to a second aspect of the examples of the disclosure, there is provided a method for user equipment sidelink communication. The method includes:
indicating, by a second user equipment, its own monitoring method and/or resource selecting method.

In the above solution, indicating, by a second user equipment, its own monitoring method and/or resource selecting method includes any one of the following actions:
indicating at least one of a monitoring method of the second user equipment or a resource selecting method of the second user equipment via an information field in a first control information;
selecting an information format of the first control information to indicate the monitoring method of the second user equipment and/or the resource selecting method of the second user equipment; or,
carrying a second user equipment ID in the first control information, wherein a user equipment type corresponding to the ID represents the monitoring method and/or resource selecting method.

In the above solution, the first control information is sidelink communication physical layer control information.

In the above solution, the physical layer control information is transmitted via a physical layer sidelink control channel and/or a physical layer sidelink data channel.

In the above solution, wherein indicating, by a second user equipment, its own monitoring method and/or resource selecting method includes:
setting, by the second user equipment, its own monitoring method and/or resource selecting method in MAC layer control information or RRC layer control information.

In the above solution, the monitoring method and/or the resource selecting method includes:
a continuous channel monitoring method and a channel monitoring based resource selecting method; or
a part-time channel monitoring method and a part-time channel monitoring based resource selecting method; or
a non-monitoring method and a random resource selecting method.

According to a third aspect of the examples of the disclosure, there is provided an apparatus for user equipment sidelink communication. The apparatus is configured in a first user equipment, and includes:
an obtaining unit configured to obtain a monitoring method of a second user equipment and/or a resource selecting method of a second user equipment.

In the above solution, the obtaining unit is further configured to:
Determine the monitoring method of the second user equipment and/or the resource selecting method of the second user equipment according to an information field for indicating the monitoring method in a first control information and/or the resource selecting method in the first control information; or,
determine the monitoring method of the second user equipment and/or the resource selecting method of the second user equipment according to an information format of the first control information; or,
determine the monitoring method of the second user equipment and/or the resource selecting method of the second user equipment according to a second user equipment ID contained in the first control information.

In the above solution, the first control information is sidelink communication physical layer control information.

In the above solution, the apparatus further includes:
a transmission unit configured to transmit the sidelink communication physical layer control information via a physical layer sidelink control channel and/or a physical layer sidelink data channel.

In the above solution, the apparatus further includes:
a reception unit configured to receive MAC layer control information or RRC layer control information transmitted from the second user equipment, wherein
the obtaining unit is further configured to obtain the monitoring method of the second user equipment and/or the resource selecting method of the second user equipment according to the MAC layer or RRC layer control information.

In the above solution, the apparatus further includes:
a resource selecting unit configured to determine a resource of the first user equipment according to the monitoring method of the second user equipment and/or the resource selecting method of the second user equipment, wherein the resource of the first user equipment does not overlap with a resource reserved by the second user equipment.

In the above solution, the resource selecting unit is further configured to determine a first RSRP threshold according to the monitoring method of the second user equipment and/or the resource selecting method of the second user equipment; and the first user equipment avoids selecting a resource that has a corresponding measurement value greater than the first RSRP threshold and is reserved by the second user equipment, or, the first user equipment avoids selecting a resource having a corresponding measurement value equal to the first RSRP threshold.

In the above solution, the resource selecting unit is further configured to receive values of the first RSRP threshold under different monitoring methods and/or resource selecting methods transmitted from a network side device; or,
  determine values of the first RSRP threshold corresponding to the different monitoring methods and/or resource selecting methods according to a communication protocol.

In the above solution, a resource selecting unit is further configured to make the first user equipment redetermine a resource in response to a resource reserved by the second user equipment overlapping with a resource determined by the first user equipment.

In the above solution, the resource selecting unit is further configured to determine a first priority threshold according to the monitoring method of the second user equipment and/or the resource selecting method of the second user equipment, and
  the first user equipment reselects a resource in response to the priority of sidelink data transmission corresponding to the resource reserved by the second user equipment being higher than the first priority threshold.

In the above solution, the resource selecting unit is further configured to receive values of the first priority threshold under different monitoring methods and/or resource selecting methods transmitted from a network side device.

In the above solution, the resource selecting unit is further configured to determine a second RSRP threshold according to the monitoring method of the second user equipment and/or the resource selecting method of the second user equipment, and
  the first user equipment reselects a resource in response to an RSRP measurement value corresponding to a resource reserved by the second user equipment being greater than the second RSRP threshold.

In the above solution, the resource selecting unit is further configured to receive values of the second RSRP threshold under different monitoring methods and/or resource selecting methods transmitted from a network side device.

In the above solution, the monitoring method and/or the resource selecting method includes:
  a continuous channel monitoring method and a channel monitoring based resource selecting method; or
  a part-time channel monitoring method and a part-time channel monitoring based resource selecting method; or
  a non-monitoring method and a random resource selecting method.

According to a fourth aspect of the examples of the disclosure, there is provided an apparatus for user equipment sidelink communication. The apparatus is configured in a second user equipment, and includes:
  an indication unit configured to indicate a monitoring method of the second user equipment and/or a resource selecting method of the second user equipment.

In the above solution, the indication unit is further configured to:
  indicate the monitoring method of the second user equipment and/or the resource selecting method of the second user equipment via an information field in a first control information; or,
  select an information format of the first control information to indicate the monitoring method of the second user equipment and/or the resource selecting method of the second user equipment; or,
  carry a second user equipment ID in the first control information, wherein a user equipment type corresponding to the ID represents the monitoring method and/or the resource selecting method.

In the above solution, the first control information is sidelink communication physical layer control information.

In the above solution, the apparatus further includes:
  a transmission unit configured to transmit the sidelink communication physical layer control information via a physical layer sidelink control channel and/or a physical layer sidelink data channel.

In the above solution, the apparatus further includes:
  a setting unit configured to set the monitoring method of the second user equipment and/or the resource selecting method of the second user equipment in MAC layer control information or RRC layer control information.

In the above solution, the monitoring method and/or the resource selecting method includes:
  a continuous channel monitoring method and a channel monitoring based resource selecting method; or
  a part-time channel monitoring method and a part-time channel monitoring based resource selecting method; or a non-monitoring method and a random resource selecting method.

According to a fifth aspect of the examples of the disclosure, there is provided a user equipment. The user equipment includes a processor, a transceiver, a memory, and an executable program stored in the memory and capable of being operated by the processor, where the processor executes the steps of the user equipment sidelink communication method when running the executable program.

According to a sixth aspect of the examples of the disclosure, there is provided a non-transitory storage medium. The storage medium stores an executable program, where the executable program implements the steps of the user equipment sidelink communication method when being executed by a processor.

What is claimed is:
1. A method for user equipment sidelink communication, comprising:
  obtaining, by a first user equipment, at least one of a monitoring method of a second user equipment or a resource selecting method of the second user equipment;
  wherein the method further comprises:
  determining, by the first user equipment, a resource of the first user equipment according to at least one of the monitoring method of the second user equipment or the resource selecting method of the second user equipment, wherein the resource of the first user equipment does not overlap with a resource reserved by the second user equipment;
  wherein determining, by the first user equipment, the resource of the first user equipment according to at least one of the monitoring method of the second user equipment or the resource selecting method of the second user equipment comprises:
  determining, by the first user equipment, a first reference signal receiving power (RSRP) threshold, according to at least one of the monitoring method of the second user equipment or the resource selecting method of the second user equipment; and avoiding, by the first user equipment, selecting a resource that has a corresponding measurement value greater than the first RSRP threshold and is reserved by the second user equipment, or avoiding, by the first user equipment, selecting a resource having a corresponding measurement value equal to the first RSRP threshold.

2. The method according to claim 1, wherein obtaining, by the first user equipment, at least one of the monitoring method of the second user equipment or the resource selecting method of the second user equipment comprises any one of:
determining at least one of the monitoring method of the second user equipment or the resource selecting method of the second user equipment according to an information field for indicating at least one of the monitoring method or the resource selecting method in first control information; or
determining, according to an information format of first control information, at least one of the monitoring method of the second user equipment or the resource selecting method of the second user equipment; or
determining, according to a second user equipment identity (ID) contained in first control information, at least one of the monitoring method of the second user equipment or the resource selecting method of the second user equipment; or
obtaining, by the first user equipment, at least one of the monitoring method of the second user equipment or the resource selecting method of the second user equipment, according to received media access control (MAC) layer control information or radio resource control (RRC) layer control information.

3. The method according to claim 2, wherein the first control information is sidelink communication physical layer control information.

4. The method according to claim 3, wherein the sidelink communication physical layer control information is transmitted via at least one of a physical layer sidelink control channel or a physical layer sidelink data channel.

5. The method according to claim 1, further comprising:
receiving values of the first RSRP threshold corresponding to different at least one of monitoring methods or resource selecting methods transmitted from a network device; or,
determining values of the first RSRP threshold corresponding to different at least one of monitoring methods or resource selecting methods according to a communication protocol.

6. The method according to claim 1, further comprising:
redetermining a resource by the first user equipment in response to a resource determined by the second user equipment overlapping with a resource determined by the first user equipment.

7. The method according to claim 6, wherein redetermining the resource by the first user equipment comprises:
determining, by the first user equipment, a first priority threshold according to at least one of the monitoring method of the second user equipment or the resource selecting method of the second user equipment, and
reselecting, by the first user equipment, the resource in response to a priority of sidelink data transmission corresponding to a resource reserved by the second user equipment being higher than the first priority threshold.

8. The method according to claim 7, further comprising:
receiving values of the first priority threshold under different at least one of the monitoring methods or the resource selecting methods transmitted from a network device.

9. The method according to claim 6, wherein redetermining the resource by the first user equipment comprises:
determining, by the first user equipment, a second RSRP threshold according to at least one of the monitoring method of the second user equipment or the resource selecting method of the second user equipment, and
reselecting, by the first user equipment, the resource in response to an RSRP measurement value corresponding to a resource reserved by the second user equipment being greater than the second RSRP threshold.

10. The method according to claim 9, further comprising:
receiving values of the second RSRP threshold under different at least one of monitoring methods or resource selecting methods transmitted from a network device.

11. The method according to claim 1, wherein at least one of the monitoring method or the resource selecting method comprises any one of:
a continuous channel monitoring method and a channel monitoring based resource selecting method;
a part-time channel monitoring method and a part-time channel monitoring based resource selecting method; or
a non-monitoring method and a random resource selecting method.

12. A method for user equipment sidelink communication, comprising:
indicating, by a second user equipment, its own at least one of a monitoring method or a resource selecting method;
wherein at least one of the monitoring method or the resource selecting method is configured to:
enable a first user equipment to determine a resource of the first user equipment according to at least one of the monitoring method of the second user equipment or the resource selecting method of the second user equipment, wherein the resource of the first user equipment does not overlap with a resource reserved by the second user equipment;
wherein at least one of the monitoring method or the resource selecting method is further configured to:
enable the first user equipment to determine a first reference signal receiving power (RSRP) threshold, according to at least one of the monitoring method of the second user equipment or the resource selecting method of the second user equipment; and
enable the first user equipment to avoid selecting a resource that has a corresponding measurement value greater than the first RSRP threshold and is reserved by the second user equipment, or enable the first user equipment to avoid selecting a resource having a corresponding measurement value equal to the first RSRP threshold.

13. The method according to claim 12, wherein indicating, by the second user equipment, its own at least one of the monitoring method or the resource selecting method comprises any one of:
indicating at least one of the monitoring method of the second user equipment or the resource selecting method of the second user equipment via an information field in first control information; or
selecting an information format of first control information to indicate at least one of the monitoring method of the second user equipment or the resource selecting method of the second user equipment; or carrying a second user equipment identity (ID) in first control information, wherein a user equipment type corresponding to the ID represents at least one of the monitoring method or the resource selecting method; or setting, by the second user equipment, its own at least one of the monitoring method or the resource selecting method, in media access control (MAC) layer control information or radio resource control (RRC) layer control information.

14. The method according to claim 13, wherein the first control information is sidelink communication physical layer control information.

15. The method according to claim 14, wherein the sidelink communication physical layer control information is transmitted via at least one of a physical layer sidelink control channel or a physical layer sidelink data channel.

16. The method according to claim 12, wherein at least one of the monitoring method or the resource selecting method comprises any one of:
　　a continuous channel monitoring method and a channel monitoring based resource selecting method;
　　a part-time channel monitoring method and a part-time channel monitoring based resource selecting method; or
　　a non-monitoring method and a random resource selecting method.

17. A first user equipment, comprising:
　　a transceiver,
　　a memory storing a computer program; and
　　one or more processors communicatively coupled to the transceiver and the memory, wherein the computer program, when executed by the one or more processors, causes the first user equipment to:
　　obtain at least one of a monitoring method of a second user equipment or a resource selecting method of the second user equipment;
　　wherein the computer program, when executed by the one or more processors, further causes the first user equipment to:

determine a resource of the first user equipment according to at least one of the monitoring method of the second user equipment or the resource selecting method of the second user equipment, wherein the resource of the first user equipment does not overlap with a resource reserved by the second user equipment;

wherein determining the resource of the first user equipment according to at least one of the monitoring method of the second user equipment or the resource selecting method of the second user equipment comprises:
　　determining a first reference signal receiving power (RSRP) threshold, according to at least one of the monitoring method of the second user equipment or the resource selecting method of the second user equipment; and
　　avoiding selecting a resource that has a corresponding measurement value greater than the first RSRP threshold and is reserved by the second user equipment, or avoiding selecting a resource having a corresponding measurement value equal to the first RSRP threshold.

18. A non-transitory computer-readable storage medium storing an executable program, wherein the executable program, when executed by one or more processors of a first user equipment, causes the first user equipment to perform the method according to claim 1.

19. A second user equipment, comprising:
　　a transceiver,
　　a memory storing a computer program; and
　　one or more processors communicatively coupled to the transceiver and the memory, wherein the computer program, when executed by the one or more processors, causes the second user equipment to perform the method according to claim 12.

20. A non-transitory computer-readable storage medium storing an executable program, wherein the executable program, when executed by one or more processors of a second user equipment, causes the second user equipment to perform the method according to claim 12.

* * * * *